United States Patent
Lu et al.

(10) Patent No.: US 8,831,551 B2
(45) Date of Patent: Sep. 9, 2014

(54) RECEIVER

(75) Inventors: Siu-Chuang Ivan Lu, San Jose, CA (US); Chi-Yao Yu, Zhubei (TW); Tsung-Han Wu, Hsinchu (TW); George Chien, Saratoga, CA (US)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 13/614,269

(22) Filed: Sep. 13, 2012

(65) Prior Publication Data
US 2013/0188755 A1   Jul. 25, 2013

Related U.S. Application Data

(60) Provisional application No. 61/589,042, filed on Jan. 20, 2012.

(51) Int. Cl.
| | |
|---|---|
| *H04B 1/26* | (2006.01) |
| *H04B 1/06* | (2006.01) |
| *H04L 25/02* | (2006.01) |
| *H04B 1/30* | (2006.01) |
| *H04B 1/16* | (2006.01) |

(52) U.S. Cl.
CPC ...... *H04L 25/02* (2013.01); *H04B 1/06* (2013.01); *H04B 1/30* (2013.01); *H04B 2001/305* (2013.01)
USPC .......................................... 455/313; 455/296

(58) Field of Classification Search
USPC ................... 455/296, 302, 313, 323, 334
See application file for complete search history.

(56) References Cited

U.S. PATENT DOCUMENTS

| | | | |
|---|---|---|---|
| 7,460,844 B2 | 12/2008 | Molnar et al. | |
| 8,351,978 B2 * | 1/2013 | Tasic et al. | 455/550.1 |
| 2010/0167681 A1 | 7/2010 | Chien et al. | |

FOREIGN PATENT DOCUMENTS

JP  2005244397  9/2005

OTHER PUBLICATIONS

English language translation of abstract of JP 2005244397 (published Sep. 8, 2005).
Sacchi, E., et al.; "A 15 mW, 70 kHz 1/f Corner Direct Conversion CMOS Receiver;" IEEE Custom Integrated Circuits Conference; 2003; pp. 459-462.
Khatri, H., et al.; "Distortion in Current Commutating Passive CMOS Downconversion Mixers;" IEEE Transactions on Microwave Theory and Techniques; vol. 57; No. 11; Nov. 2009; pp. 2671-2681.
Darabi, H.; "A Blocker Filtering Technique for SAW-Less Wireless Receivers;" IEEE Journal of Solid-State Circuits; vol. 42; No. 12; Dec. 2007; pp. 2766-2773.
Dufrene, K., et al.; "Digital Adaptive IIP2 Calibration Scheme for CMOS Downconversion Mixers;" IEEE Journal of Solid-State Circuits; vol. 43; No. 11; Nov. 2008; pp. 2434-2445.

* cited by examiner

*Primary Examiner* — Lee Nguyen
(74) *Attorney, Agent, or Firm* — McClure, Qualey & Rodack, LLP

(57) ABSTRACT

A receiver includes a low noise amplifier (LNA), a passive mixer, a passive filter, a baseband processing block and a voltage controller. The LNA receives and amplifies a radio frequency (RF) signal. The passive mixer is coupled to the LNA without any AC coupling capacitance therebetween, and generates an intermediate frequency signal by downconverting the RF signal. The passive filter filters the intermediate frequency signal. The baseband processing block includes a transimpedance amplifier (TIA) and processes the filtered intermediate frequency signal. The voltage controller keeps a first node and a second node of a signal path to be around a common DC voltage, wherein the first node is located between an output terminal of the LNA and an input terminal of the passive mixer, and the second node is located between an output terminal of the passive mixer and an output terminal of the TIA.

18 Claims, 2 Drawing Sheets

RECEIVER

This application claims the benefit of U.S. provisional application Ser. No. 61/589,042, filed Jan. 20, 2012, the subject matter of which is incorporated herein by reference.

BACKGROUND

1. Technical Field

The invention relates in general to a receiver.

2. Background

A concern when designing radio frequency (RF) receivers for wireless communication systems is to detect a relatively weak in-band signal in the presence of a strong out-of-band jammer. If the linearity of the receiver is insufficient, such jammer may saturate the receiver and block the in-band signal. Using a surface acoustic wave (SAW) filter in front of the receiver is the most common solution to this problem. The SAW filter has band-pass capability with a very high quality (Q) factor, thereby capable of providing a large rejection ratio to the out-of-band jammer (normally greater than 20 dB) and meeting the receiver linearity requirement.

However, in-band attenuation of the SAW filter tends to make it harder to detect weak signals, creating the need for an even more sensitive receiver after the SAW filter. In addition, there is currently no economical way to implement SAW filters or their equivalents in the same processes as the active circuits that follow them, which are typically produced using CMOS or BiCMOS processes and either silicon or silicon germanium technologies. Therefore, SAW filters usually have to be purchased additionally and significantly increase the cost and consume equally valuable circuit board area in a typical communication device. The above problems are further exacerbated by the proliferation of different frequency bands that a communication device has to be compatible with.

SUMMARY

The disclosure is directed to a receiver which provides highly linear baseband signals for a wireless communication system without AC coupling capacitances.

According to a first aspect of the present disclosure, a receiver is provided. The receiver includes a low noise amplifier (LNA), a passive mixer, a passive filter, a baseband processing block and a voltage controller. The LNA receives and amplifies a radio frequency (RF) signal. The passive mixer is coupled to the LNA without any AC coupling capacitance therebetween, and generates an intermediate frequency signal by down-converting the RF signal. The passive filter filters the intermediate frequency signal. The baseband processing block includes a transimpedance amplifier (TIA) and processes the filtered intermediate frequency signal. The voltage controller keeps a first node and a second node of a signal path to be around a common DC voltage, wherein the first node is located between an output terminal of the LNA and an input terminal of the passive mixer, and the second node is located between an output terminal of the passive mixer and an output terminal of the TIA.

According to a second aspect of the present disclosure, a receiver is provided. The receiver includes a low noise amplifier (LNA), a passive mixer, a passive filter and a baseband processing block. The LNA receives and amplifies a radio frequency (RF) signal. The passive mixer is coupled to the LNA without any AC coupling capacitance therebetween, and generates an intermediate frequency signal by down-converting the RF signal. The passive filter filters the intermediate frequency signal. The baseband processing block includes a transimpedance amplifier (TIA) and processes the filtered intermediate frequency signal. The passive mixer is further arranged to up-convert an intermediate frequency voltage established at an input terminal of the passive filter into an RF band voltage at an input terminal of the passive mixer. The passive filter is further arranged to suppress a voltage swing of the intermediate frequency voltage.

According to a third aspect of the present disclosure, a receiver is provided. The receiver includes a low noise amplifier (LNA), a passive mixer, a passive filter and a baseband processing block. The LNA receives and amplifies a radio frequency (RF) signal. The passive mixer is coupled to the LNA without any AC coupling capacitance therebetween, and generates an intermediate frequency signal by down-converting the RF signal. The passive filter filters the intermediate frequency signal. The baseband processing block includes a transimpedance amplifier (TIA) and processes the filtered intermediate frequency signal. A first node, located between an output terminal of the LNA and an input terminal of the passive mixer, and a second node, located between an output terminal of the passive mixer and an output terminal of the TIA, are arranged to be kept at a common DC voltage, so that there is no DC current through the passive mixer.

The invention will become apparent from the following detailed description of the preferred but non-limiting embodiments. The following description is made with reference to the accompanying drawings.

DETAILED DESCRIPTION OF THE INVENTION

The disclosure proposes a receiver which provides highly linear baseband signals for a wireless communication system without any AC coupling capacitance between a low noise amplifier (LNA) and a passive mixer.

Figure 1A:
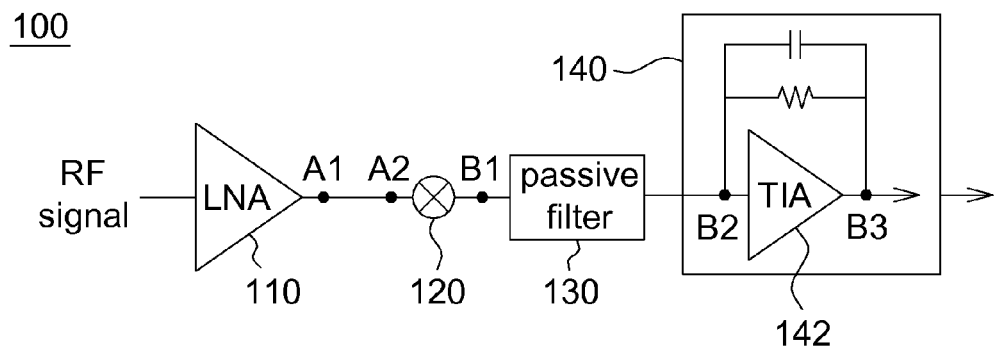
FIGS. 1A and 1B show schematic illustrations of receivers according to an embodiment.
Figure 1B:
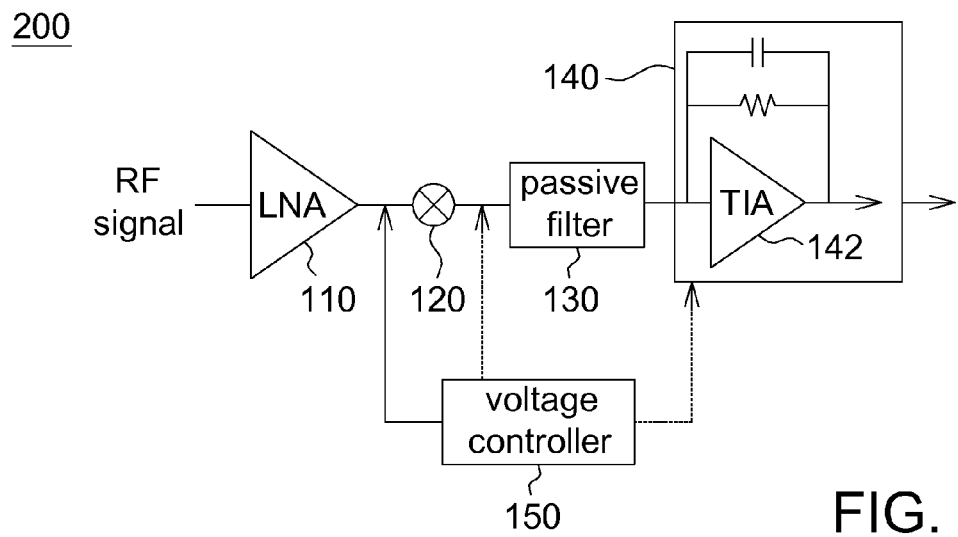

Referring to FIGS. 1A and 1B, schematic illustrations of receivers according to an embodiment are shown. The receiver 100 includes a low noise amplifier (LNA) 110, a passive mixer 120, a passive filter 130 and a baseband processing block 140. The LNA 110 receives and amplifies a radio frequency (RF) signal for better driving post-stage circuits. In the embodiments of the present disclosure, the LNA 110 can be a low noise transconductance amplifier (LNTA), but it is not limited thereto. In addition, the LNA 110 can further cooperate with a matching network to converting a single-ended RF signal into a differential pair RF signal while adopting differential input ports.

The passive mixer 120 is coupled to the LNA 11 without any AC coupling capacitance therebetween. Conventional receiver includes AC coupling capacitances for DC signal isolation between the LNA and the mixer. Consequently, the equivalent impedance at an output terminal of the LNA looking into the mixer is composed of the impedance of the AC coupling capacitances, the impedance of the mixer and the impedance of the baseband processing block. For out of band signals, the impedance of the AC coupling capacitances dominates the equivalent impedance. Therefore, the receiver 100 proposed in the disclosure removes the conventional used AC coupling capacitances between the LNA 110 and the passive mixer 120, hence the low equivalent impedance results in low voltage swing operation of the receiver 100, thereby improving out-of-band dynamic range and linearity.

Figure 2:
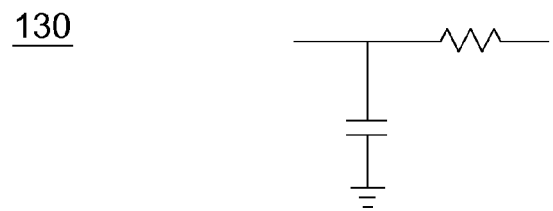
FIG. 2 shows a circuit diagram of a passive filter according to an embodiment.

The passive mixer 120 generates an intermediate frequency signal by down-converting the RF signal. Moreover, the passive mixer 120 down-converts an in-band part of the RF signal to a passband of the passive filter 130, and down-converts an out-of-band part of the RF signal to a stopband of the passive filter 130. The passive filter 130 filters the intermediate frequency signal. The passive filter 130 is such as a resistor-capacitor (RC) type current-in current-out filter as shown in FIG. 2, but it is not limited thereto. In other words, a current-mode passive filter (e.g., the RC type current-in current-out filter) is used in the embodiment as a DC low impedance when the AC coupling capacitance is removed. The embodiments of the disclosure can also use other configurations of RC filters for providing low-pass, band-pass or high-pass frequency responses. The baseband processing block 140 includes a transimpedance amplifier (TIA) and processes the filtered intermediate frequency signal.

In FIG. 1A, a first node (e.g. nodes A1 or A2), located between an output terminal of the LNA 110 and an input terminal of the passive mixer 120, and a second node (e.g. nodes B1, B2, or B3), located between an output terminal of the passive mixer 120 and an output terminal of the TIA 142, are arranged to be kept at a common DC voltage, so that there is no DC current through the passive mixer 120, thereby causing no influence and maintaining low noise figure (NF).

There is no limitation in said techniques for keeping the first node and the second node at the common DC voltage as long as there is no DC current through the passive mixer 120. For example, the receiver 200 shown in FIG. 1B further includes a voltage controller 150 for keeping the first node and the second node of the signal path to be around the common DC voltage. The voltage controller 150 can directly apply the common DC voltage to the first node and the second node, or track one of voltages of the first node and the second node with the other, and it is not limited thereto.

In addition, the passive mixer 120 is further arranged to up-convert an intermediate frequency voltage established at an input terminal of the passive filter 130 into an RF band voltage at an input terminal of the passive mixer 120, and the passive filter 130 is further arranged to suppress a voltage swing of the intermediate frequency voltage. Consequently, low out-of-band voltage swings at RF and baseband frequencies can provide better IIP2.

Moreover, the passive mixer 120, the passive filter 130 and the baseband processing block 140 are arranged to provide a low differential DC impedance to the nodes A1 or A2, so as to prevent a DC offset voltage generated at the output terminal of the LNA 110. With the low differential DC impedance, the DC offset voltage does not occur and the linearity bottleneck at the output stage of the LNA 110 is removed, thereby improving linearity.

Figure 3:
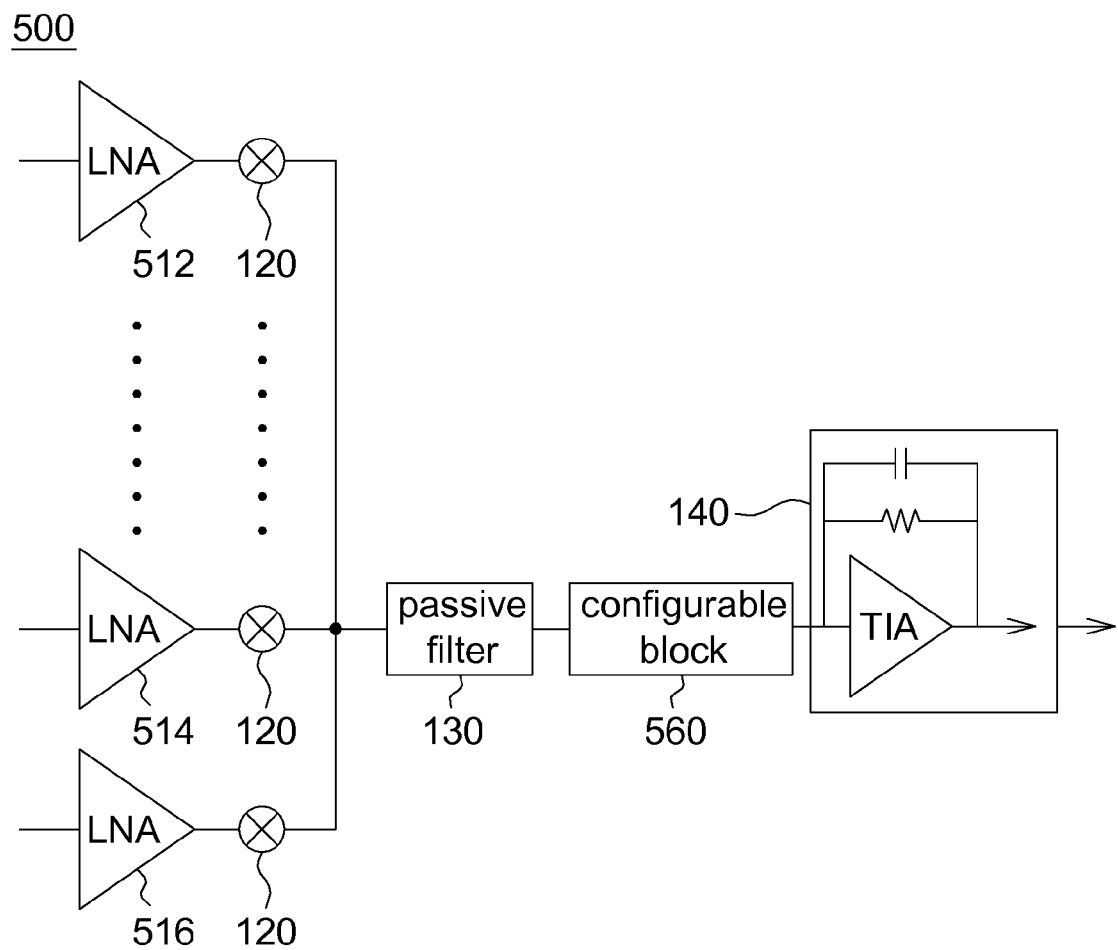
FIG. 3 shows a schematic illustration of a receiver according to an embodiment.

The proposed receiver in the disclosure can be applied to different mobile telecommunication systems, so the proposed receiver has high versatility. For example, the receiver can be applied to WCDMA and/or GSM-GPRS-EDGE (GGE) applications. Furthermore, the proposed receiver in the disclosure can also be applied to multi-frequency telecommunication systems. Referring to FIG. 3, a schematic illustration of a receiver according to an embodiment is shown. The receiver 500 includes multiple LNAs 512 to 516, a passive mixer 120, a passive filter 130, a configurable block 560 and a baseband processing block 140. The LNAs 512 to 516 receive and amplify RF signals corresponding to different mobile telecommunication systems. The configurable block 560 reconfigures an input impedance of the baseband processing block 140 for the different mobile telecommunication systems.

The proposed receiver of the disclosure can provide highly linear baseband signals for a wireless communication system without a SAW filter or other similar components that are expensive to fabricate and consume large space, and also without any AC coupling capacitance between the LNA and the passive mixer.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, comprising:
   a low noise amplifier (LNA) for receiving and amplifying a radio frequency (RF) signal;
   a passive mixer, coupled to the LNA without any AC coupling capacitance therebetween, for generating an intermediate frequency signal by down-converting the RF signal;
   a passive filter for filtering the intermediate frequency signal;
   a baseband processing block, including a transimpedance amplifier (TIA), for processing the filtered intermediate frequency signal; and
   a voltage controller for keeping a first node and a second node of a signal path to be around a common DC voltage, wherein the first node is located between an output terminal of the LNA and an input terminal of the passive mixer, and the second node is located between an output terminal of the passive mixer and an output terminal of the TIA.

2. The receiver according to claim 1, wherein the voltage controller is arranged to apply the common DC voltage to the first node and the second node.

3. The receiver according to claim 1, wherein the voltage controller is arranged to track one of voltages of the first node and the second node with the other.

4. The receiver according to claim 1, wherein the voltage controller is arranged to keep the first node and the second node to be at the common DC voltage, so that there is no DC current flowing through the passive mixer.

5. The receiver according to claim 1, wherein the passive mixer, the passive filter and the baseband processing block are arranged to provide low differential DC impedance so as to prevent a DC offset voltage generated at the output terminal of the LNA.

6. The receiver according to claim 1, further comprising:
   a configurable block for reconfiguring an input impedance of the baseband processing block for different mobile telecommunication systems.

7. The receiver according to claim 1, wherein the passive mixer is arranged to down-convert an in-band part of the RF signal to a passband of the passive filter, and down-convert an out-of-band part of the RF signal to a stopband of the passive filter.

8. The receiver according to claim 1, wherein the passive filter is a resistor-capacitor (RC) type current-in current-out filter.

9. A receiver, comprising:
   a low noise amplifier (LNA) for receiving and amplifying a radio frequency (RF) signal;

a passive mixer, coupled to the LNA without any AC coupling capacitance therebetween, for generating an intermediate frequency signal by down-converting the RF signal;

a passive filter for filtering the intermediate frequency signal;

a baseband processing block, including a transimpedance amplifier (TIA), for processing the filtered intermediate frequency signal; and a voltage controller for keeping a first node and a second node of a signal path to be around a common DC voltage;

wherein the passive mixer is further arranged to up-convert an intermediate frequency voltage established at an input terminal of the passive filter into an RF band voltage at an input terminal of the passive mixer, and the passive filter is further arranged to suppress a voltage swing of the intermediate frequency voltage;

wherein the first node is located between an output terminal of the LNA and an input terminal of the passive mixer, and the second node is located between an output terminal of the passive mixer and an output terminal of the TIA.

10. The receiver according to claim 9, wherein the voltage controller is arranged to apply the common DC voltage to the first node and the second node.

11. The receiver according to claim 9, wherein the voltage controller is arranged to track one of voltages of the first node and the second node with the other.

12. The receiver according to claim 9, wherein the voltage controller is arranged to keep the first node and the second node to be at the common DC voltage, so that there is no DC current flowing through the passive mixer.

13. A receiver, comprising:
a low noise amplifier (LNA) for receiving and amplifying a radio frequency (RF) signal;

a passive mixer, coupled to the LNA without any AC coupling capacitance therebetween, for generating an intermediate frequency signal by down-converting the RF signal;

a passive filter for filtering the intermediate frequency signal; and a baseband processing block, including a transimpedance amplifier (TIA), for processing the filtered intermediate frequency signal;

wherein a first node, located between an output terminal of the LNA and an input terminal of the passive mixer, and a second node, located between an output terminal of the passive mixer and an output terminal of the TIA, are arranged to be kept at a common DC voltage, so that there is no DC current flowing through the passive mixer.

14. The receiver according to claim 13, further comprising:
a voltage controller for applying the common DC voltage to the first node and the second node.

15. The receiver according to claim 13, further comprising:
a voltage controller for tracking one of voltages of the first node and the second node with the other.

16. The receiver according to claim 13, wherein the passive mixer, the passive filter and the baseband processing block are arranged to provide low differential DC impedance so as to prevent a DC offset voltage generated at the output terminal of the LNA.

17. The receiver according to claim 13, further comprising:
a configurable block for reconfiguring an input impedance of the baseband processing block for different mobile telecommunication systems.

18. The receiver according to claim 13, wherein passive filter is an RC type current-in current-out filter.

* * * * *